(12) United States Patent
Seo et al.

(10) Patent No.: US 12,491,018 B2
(45) Date of Patent: Dec. 9, 2025

(54) SKIN TREATMENT DEVICE WITH OVERHEATING PROTECTION

(71) Applicant: ASTERASYS CO., LTD., Seoul (KR)

(72) Inventors: Eun Taek Seo, Seoul (KR); Jong Seok Kim, Seoul (KR)

(73) Assignee: ASTERASYS CO., LTD., Seoul (KR)

( * ) Notice: Subject to any disclaimer, the term of this patent is extended or adjusted under 35 U.S.C. 154(b) by 0 days.

(21) Appl. No.: 18/713,648

(22) PCT Filed: Nov. 2, 2023

(86) PCT No.: PCT/KR2023/017326
§ 371 (c)(1),
(2) Date: May 26, 2024

(87) PCT Pub. No.: WO2024/147459
PCT Pub. Date: Jul. 11, 2024

(65) Prior Publication Data
US 2025/0312082 A1    Oct. 9, 2025

(30) Foreign Application Priority Data

Jan. 3, 2023  (KR) .................. 10-2023-0000915

(51) Int. Cl.
A61B 18/12    (2006.01)
A61B 18/08    (2006.01)
A61B 18/00    (2006.01)

(52) U.S. Cl.
CPC .. *A61B 18/082* (2013.01); *A61B 2018/00017* (2013.01); *A61B 2018/00023* (2013.01);
(Continued)

(58) Field of Classification Search
CPC ........ A61B 18/082; A61B 2018/00017; A61B 2018/00023; A61B 2018/00047;
(Continued)

(56) References Cited

U.S. PATENT DOCUMENTS 8,469,951 B2 *   6/2013   Ben-Haim ......... A61B 18/1815
                                                  606/33
2004/0000316 A1 *  1/2004  Knowlton ............ A61B 18/14
                                                  606/41
(Continued)

FOREIGN PATENT DOCUMENTS

CN    105358213 B    9/2018
JP    2012-061251 A   3/2012
(Continued)

*Primary Examiner* — Daniel W Fowler
(74) *Attorney, Agent, or Firm* — AJU IP Global PLLC

(57) ABSTRACT

The present invention relates to a skin treatment device with overheating protection and includes a grip unit allowed to be gripped, a power unit connected to the grip unit to supply power, an assembly unit detachably attached to the grip unit, an output unit mounted on the assembly unit, connected to the grip unit to receive power, and configured to come into contact with skin to output a high frequency pulse, and a cooling unit configured to cool the output unit, and thus it is possible to prevent skin damage due to overheating of the output unit during the skin treatment process.

7 Claims, 8 Drawing Sheets

(52) U.S. Cl.
CPC ............... *A61B 2018/00047* (2013.01); *A61B 2018/0047* (2013.01)

(58) Field of Classification Search
CPC ..... A61B 2018/0047; A61B 1/08; A61B 1/32; A61B 1/40
See application file for complete search history.

(56) References Cited

U.S. PATENT DOCUMENTS

| | | | |
|---|---|---|---|
| 2009/0018628 A1* | 1/2009 | Burns | A61N 1/403 607/101 |
| 2016/0089537 A1* | 3/2016 | Yamazaki | A61B 18/14 601/2 |

FOREIGN PATENT DOCUMENTS

| | | |
|---|---|---|
| KR | 10-2010-0060222 A | 10/2011 |
| KR | 10-1158009 B1 | 6/2012 |
| KR | 10-2014-0013643 A | 2/2014 |
| KR | 10-1619858 B1 | 6/2016 |
| KR | 10-2533358 B1 | 5/2023 |

\* cited by examiner

SKIN TREATMENT DEVICE WITH OVERHEATING PROTECTION

TECHNICAL FIELD

The present invention relates to a skin treatment device with overheating protection, and more particularly, to a skin treatment device with overheating protection, of which a structure can be simplified using a Peltier element and an overheated portion can be safely cooled.

BACKGROUND ART

In general, there are many skin aesthetic devices that prevent skin aging by a means for massaging the face.

A monopolar radio frequency (RF) device for improving skin elasticity uses a principle that heat is generated at a handpiece contact part when radio frequency power is applied to two poles, of which one pole is formed on a handpiece that comes into contact with a skin surface of a desired part and the other pole is formed on a grounding pad that is attached to the back or another part of the body, because there is a body impedance present between the two poles.

In the related art, when a high frequency pulse having high energy is applied such that heat for deforming skin cells is generated, high heat may be generated on a skin epidermis layer with which the handpiece comes into contact and may cause severe pain and burns, and thus a method in which a small liquefied nitrogen (LN2) tank is installed in a device main body, the small LN2 tank is connected to the handpiece through a valve and a tube, and LN2 is sprayed through a nozzle to a flexible printed circuit board (FPCB) back surface constituting an electrode of the handpiece to cool the epidermis is used.

However, LN2 is a cryogenic liquid with a boiling point of −196° C. Therefore, a high pressure safety container should be used to avoid frostbite during handling while maintaining the LN2 in a liquid state in a small container. LN2 is a dangerous substance that requires strict attention in handling. Meanwhile, the tube and the valve are used to connect and control the LN2 tank installed in the main body to the nozzle of the handpiece, but in a case where a failure occurs in these portions, an accident occurs. In addition, since nitrogen gas vaporized from the LN2 has an extremely low temperature, the nitrogen gas should be sprayed in a very short time in synchronization with a high frequency pulse, but when the spraying time increases, at a handpiece electrode part, moisture in the atmosphere is combined with the nitrogen gas and immediately condenses, and there is danger of frostbite on the skin. Therefore, there is a problem in that it is difficult to optimally control the time and cycle of nitrogen gas spraying to properly adjust a cooling temperature of the skin surface within a range in which a pain reduction effect is possible. Therefore, there is a need to improve this.

The background of the present invention is disclosed in Korean Patent Laid-Open Publication No 2014-0013643 (Published Feb. 5, 2014, Title: Skin aesthetic tool).

DISCLOSURE

Technical Problem

The present invention has been devised to improve the above problems, and the present invention is directed to providing a skin treatment device with overheating protection, of which a structure can be simplified using a Peltier element and an overheated portion can be safely cooled.

Technical Solution

A skin treatment device with overheating protection according to the present invention, includes: a grip unit allowed to be gripped; a power unit connected to the grip unit to supply power; an assembly unit detachably attached to the grip unit; an output unit mounted on the assembly unit, connected to the grip unit to receive power, and configured to come into contact with skin to output a high frequency pulse; and a cooling unit configured to cool the output unit.

The grip unit may include: a grip case part; a grip connection part mounted on the grip case part and connecting the power unit and the output unit; and a grip manipulation part mounted on the grip case part and coupled to or separated from the assembly unit.

The grip connection part may include: a connection body portion coupled to a front end portion of the grip case part; and at least one connection pin portion passing through the connection body portion and having one end portion connected to the power unit and the other end portion connected to the output unit.

The grip manipulation part may include: a manipulation panel portion disposed inside the grip case part; a manipulation button portion protruding upward from the manipulation panel portion and is exposed to the outside through the grip case part; a manipulation locking portion extending from the manipulation panel portion and locked and fixed to the assembly unit through the grip connection part; and a manipulation restoring portion configured to elastically support the manipulation panel portion.

The assembly unit may include: an assembly case part of which a front portion is open to expose the output unit to the outside; and an assembly support part built in the assembly case part and configured to support the output unit and the cooling unit.

The assembly unit may further include an assembly guide part coupled to the assembly support part and inserted into the grip unit to guide air into the assembly support part.

The cooling unit may include: a cooling element part configured to come into contact with the output unit and cool the output unit with a Peltier element; and a cooling heat exchanger part configured to come into contact with the cooling element part and discharge heat transmitted through the cooling element part.

The skin treatment device with overheating protection according to the present invention may further include an air cooling unit configured to supply external air to the cooling unit to forcibly cool the cooling unit.

The air cooling unit may include: an air inflow part formed in the grip unit and configured to guide external air into the grip unit; an air discharge part built in the grip unit and configured to discharge air introduced through the air inflow part to the cooling unit; and an air outflow part formed in the assembly unit and configured to guide air that has passed through the cooling unit to the outside.

Advantageous Effects

In a skin treatment device with overheating protection according to the present invention, even if an output unit is heated during a skin treatment process, the output unit is rapidly cooled by a cooling unit, and thus skin damage due to overheating can be prevented, and an assembly unit equipped with the output unit and the cooling unit is detachably attached to a grip unit, and thus the assembly unit can be conveniently replaced and used.

A skin treatment apparatus with overheating protection according to the present invention adopts a Peltier element instead of liquefied nitrogen, which reduces manufacturing costs, is safe, and has a simple structure, making maintenance easy in the case of failure.

MODES OF THE INVENTION

Figure 1:
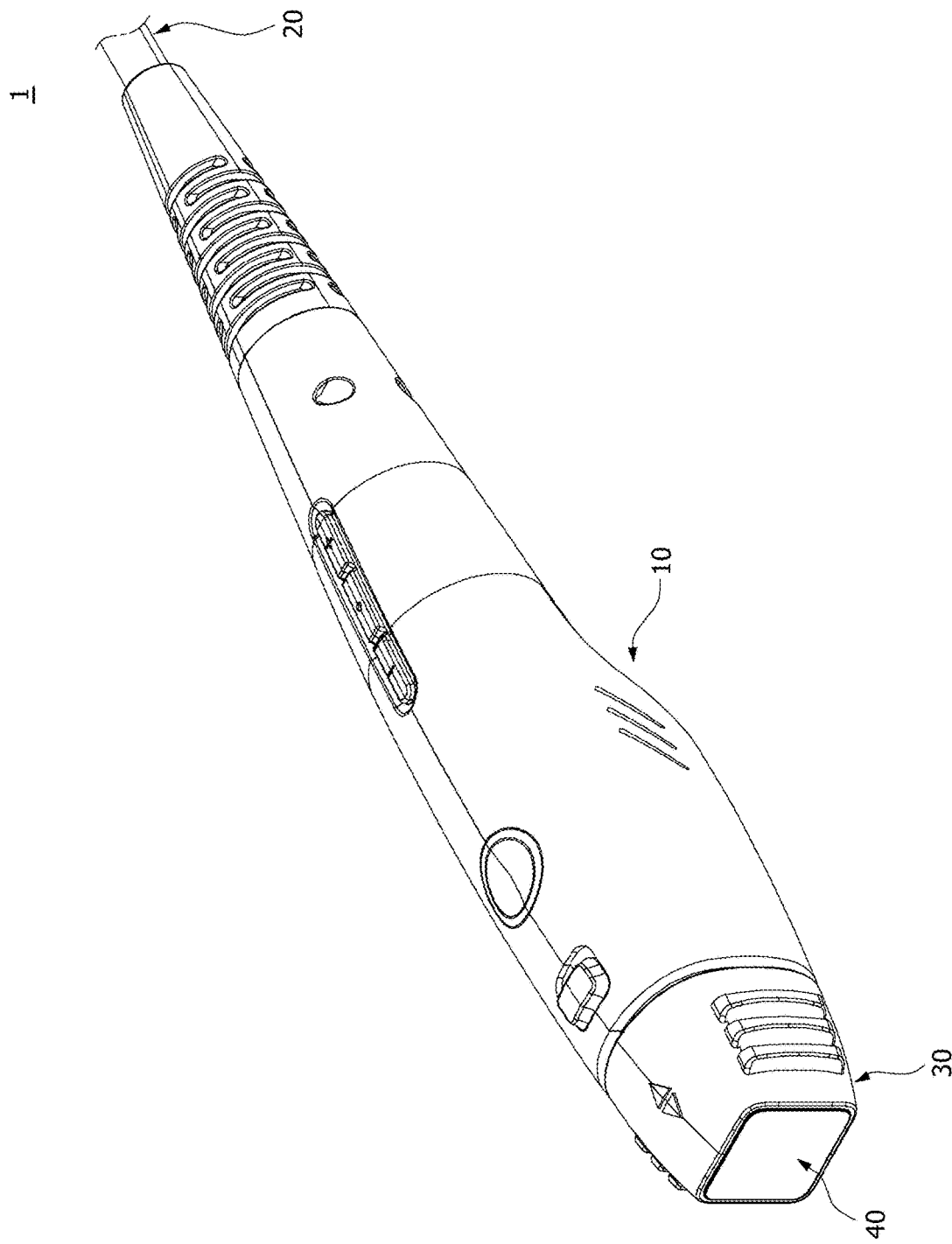
FIG. 1 is a schematic diagram illustrating a coupled state of a skin treatment device with overheating protection according to one embodiment of the present invention.

Hereinafter, embodiments of a skin treatment device with overheating protection according to the present invention will be described with reference to the accompanying drawings. In this process, the thicknesses of lines or the sizes of components shown in the drawings may be exaggerated for clarity and convenience of explanation. In addition, terms which will be described below are terms defined in consideration of functions in the present invention, which may vary depending on the intention or convention of the user or operator. Therefore, the definitions of these terms should be based on the content throughout this specification.

Figure 2:
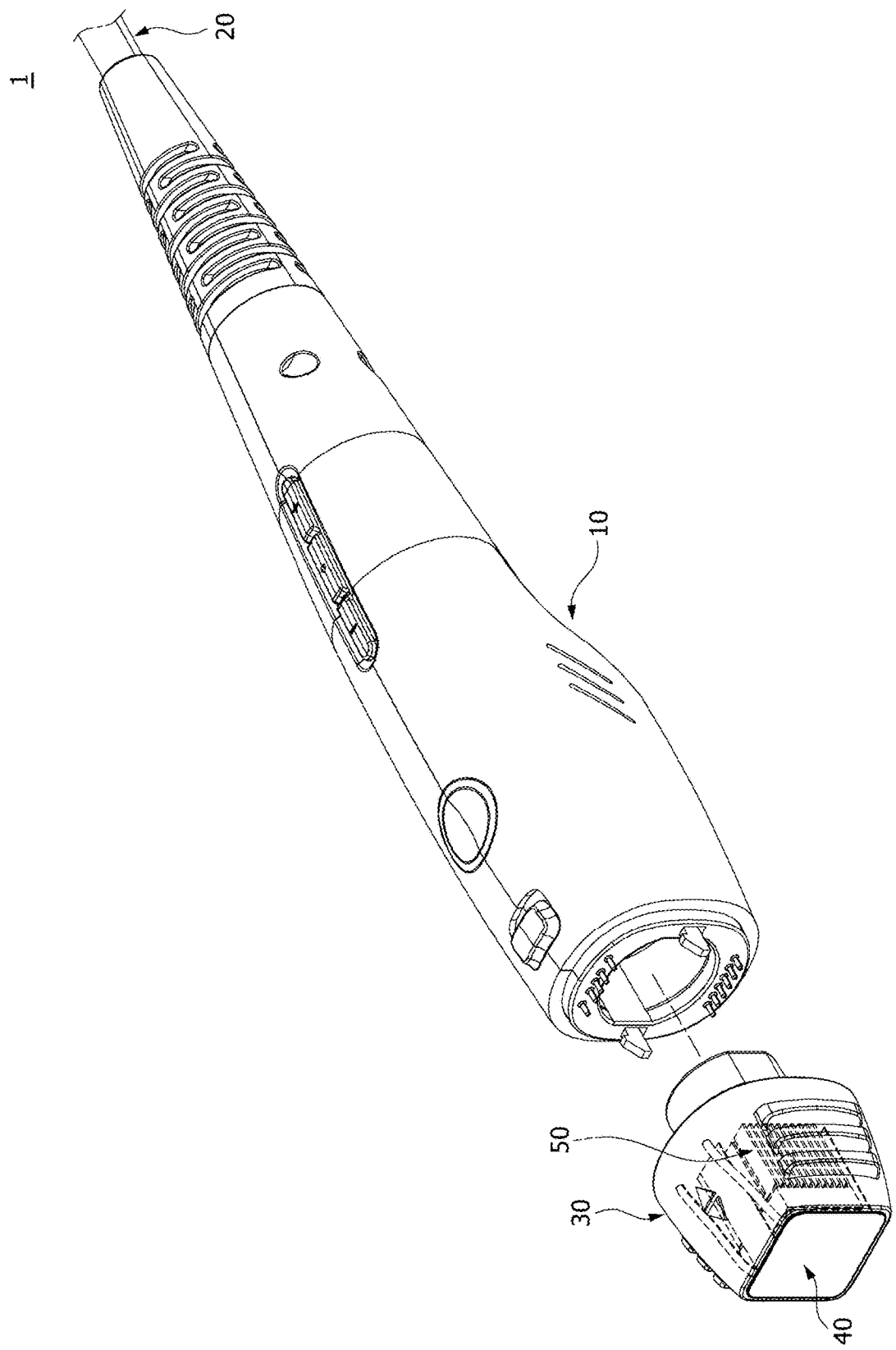
FIG. 2 is a schematic diagram illustrating a separated state of the skin treatment device with overheating protection according to one embodiment of the present invention.

FIG. 1 is a schematic diagram illustrating a coupled state of a skin treatment device with overheating protection according to one embodiment of the present invention, and FIG. 2 is a schematic diagram illustrating a separated state of the skin treatment device with overheating protection according to one embodiment of the present invention. Referring to FIGS. 1 and 2, a skin treatment device 1 with overheating protection according to one embodiment of the present invention may include a grip unit 10, a power unit 20, an assembly unit 30, an output unit 40, and a cooling unit 50.

The grip unit 10 is formed to be gripped by a user, and the power unit 20 is connected to the grip unit 10 to supply power. For example, the grip unit 10 may be made of a resin material and include a board in which a circuit for controlling the device is built in the inside, a button for manipulating the device, and the like. The power unit 20 is connected to the board and various electronic components built in the grip unit 10 to be a power cable through which power may be supplied. In addition, the power unit 20 may be built in the grip unit 10 and become a chargeable battery.

The assembly unit 30 may be detached from and attached to the grip unit 10. For example, the assembly unit 30 may be mounted on the grip unit 10 and replaced once skin treatment is completed. A button is provided in the grip unit 10 to manipulate the detachment and attachment with respect to the assembly unit 30.

The output unit 40 is mounted on the assembly unit 30 and connected to the grip unit 10 to receive power and to output a high frequency pulse while in contact with the skin. For example, the output unit 40 is mounted on the assembly unit 30 to be exposed to the outside and electrically connected to the power unit 20 to be operated by a button provided in the grip unit 10.

The cooling unit 50 may cool the output unit 40. For example, the cooling unit 50 may be built in the assembly unit 30 and come into contact with the rear surface of the output unit 40 to cool the output unit 40. The cooling unit 50 may be electrically connected to the power unit 20 and discharge heat through the assembly unit 30.

Figure 3:
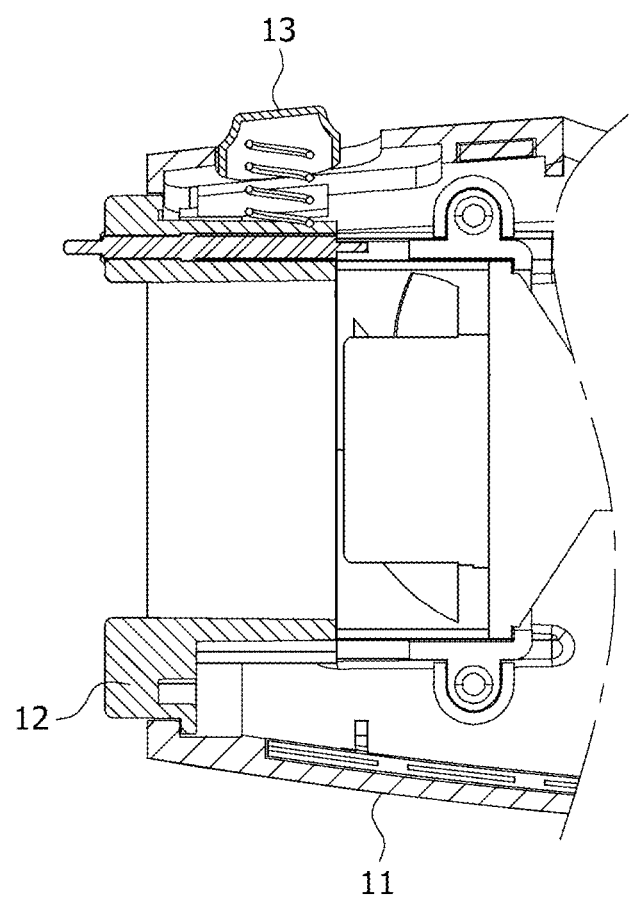
FIG. 3 is a schematic diagram illustrating a grip unit according to one embodiment of the present invention.

FIG. 3 is a schematic diagram illustrating the grip unit according to one embodiment of the present invention. Referring to FIG. 3, the grip unit 10 according to one embodiment of the present invention may include a grip case part 11, a grip connection part 12, and a grip manipulation part 13.

The grip case part 11 may have a shape in which a space is formed in the inside thereof and of which a front portion is open. For example, the power unit 20 may be connected to the rear end portion of the grip case part 11, and the board may be mounted on the inside of the grip case part 11.

The grip connection part 12 may be mounted on the grip case part 11 and connect the power unit 20 and the output unit 40. As an example, the grip connection part 12 may be mounted on the front end portion of the grip case part 11. The grip connection part 12 may come into contact with the cooling unit 50 in addition to the output unit 40 to provide electrical signals for their operation.

The grip manipulation part 13 may be mounted on the grip case part 11 and coupled to or separated from the assembly unit 30. For example, the grip manipulation part 13 may be automatically locked and fixed to the assembly unit 30 by a restoring force when assembled with the assembly unit 30. The assembly unit 30 may be separated from the grip unit 10 by manipulation of the grip manipulation part 13.

Figure 4:
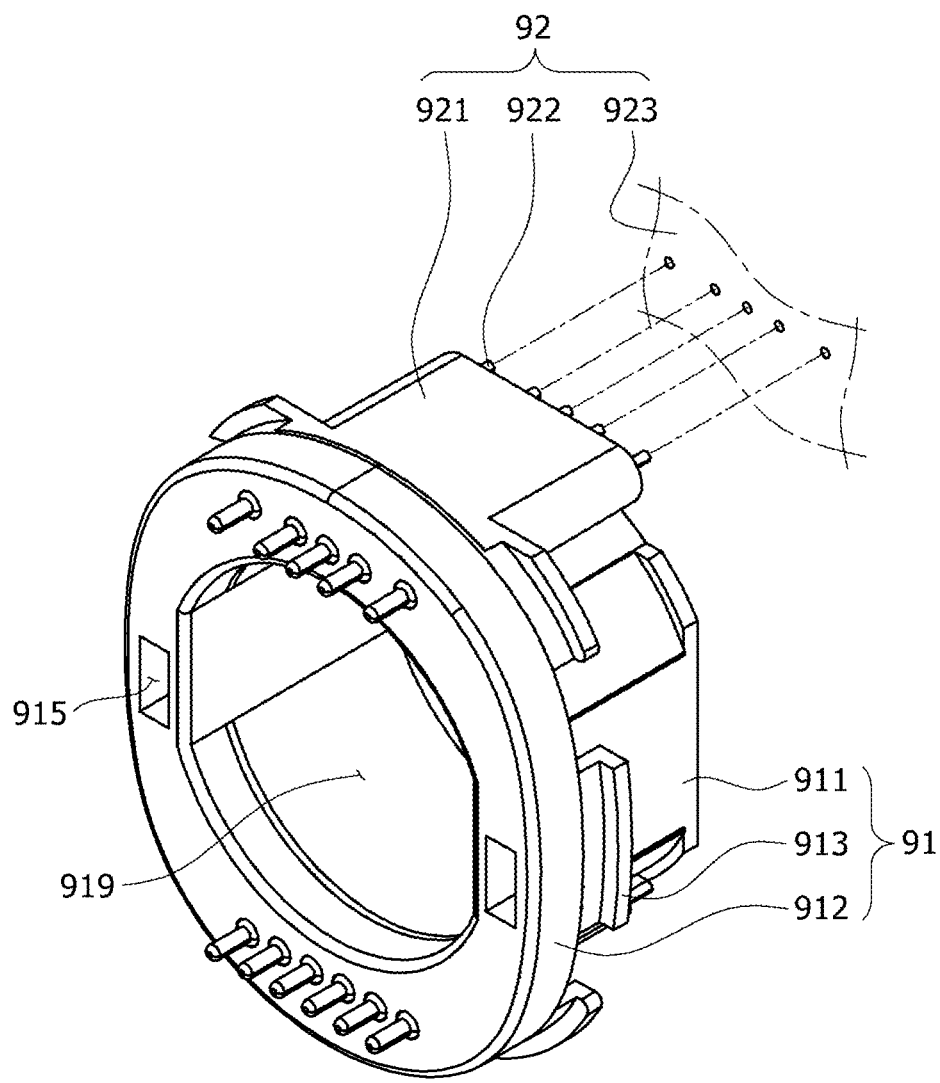
FIG. 4 is a schematic diagram illustrating a grip connection part according to one embodiment of the present invention.

FIG. 4 is a schematic diagram illustrating the grip connection part according to one embodiment of the present invention. Referring to FIG. 4, the grip connection part 12 may include a connection body portion 91 and a connection pin portion 92.

The connection body portion 91 may be coupled to the front end portion of the grip case part 11. For example, the connection body portion 91 may include a body duct portion 911 in which a body hole portion 919 is formed, a body rim portion 912 extending laterally from a front portion of the body duct portion 911, and a body locking portion 913 formed on the body rim portion 912 and locked and fixed to the inside of the grip case part 11. A through hole portion 915 may be formed in the body rim portion 912. A pair of through hole portions 915 may be disposed on the left and right.

The connection pin portion 92 may pass through the connection body portion 91, and one end portion of the connection pin portion 92 may be connected to the power unit 20, and the other end portion of the connection pin portion 92 may be connected to the output unit 40. For example, the connection pin portion 92 may include a pin support portion 921 formed on the connection rim portion 912, a plurality of pin contact portions 922 mounted on the pin support portion 921, and a pin connection portion 923 connecting the pin contact portion 922 and the power unit 20 or the board. The plurality of pin contact portions 922 may protrude forward from the connection body portion 91 and come into contact with the output unit 40 and the cooling unit 50 mounted on the assembly unit 30.

Figure 5:
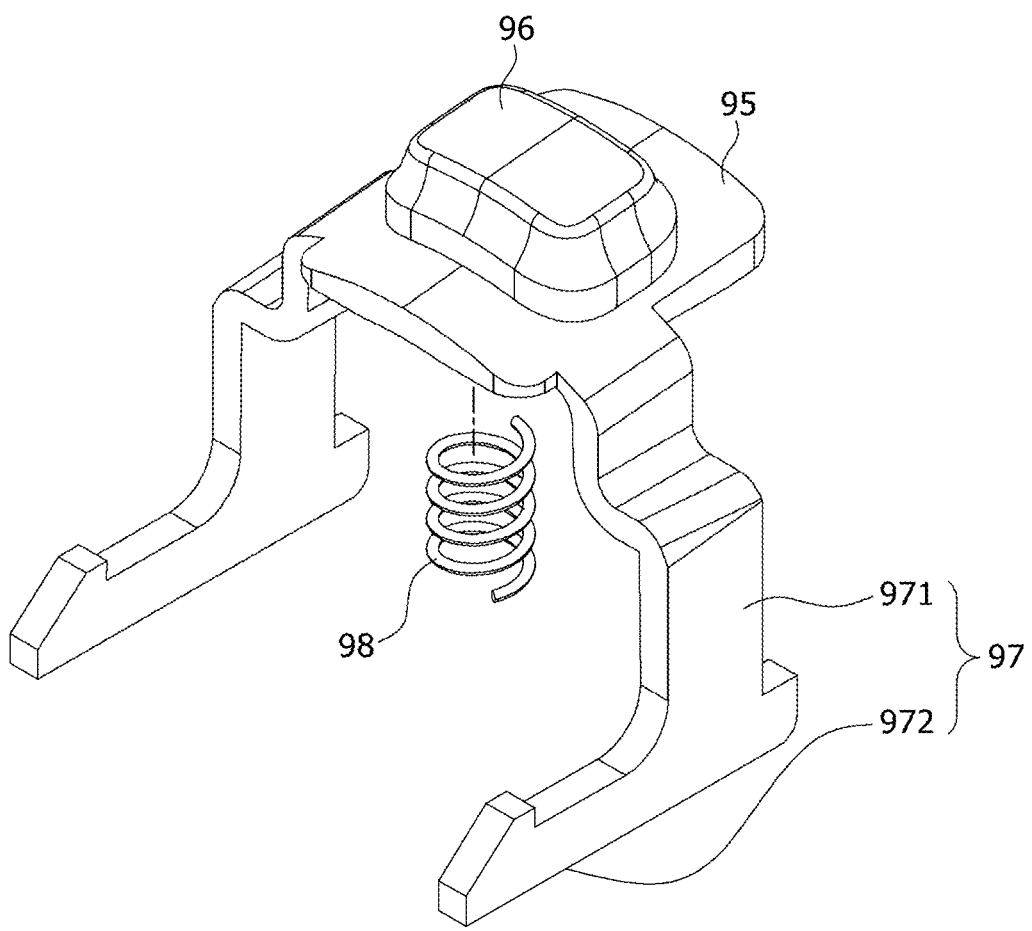
FIG. 5 is a schematic diagram illustrating a grip manipulation part according to one embodiment of the present invention.

FIG. 5 is a schematic diagram illustrating the grip manipulation part according to one embodiment of the present invention. Referring to FIG. 5, the grip manipulation part 13 according to one embodiment of the present invention may include a manipulation panel portion 95, a manipulation button portion 96, a manipulation locking portion 97, and a manipulation restoring portion 98.

The manipulation panel portion 95 may be disposed inside the grip case part 11. For example, the manipulation panel portion 95 may be disposed above the connection body portion 91. The manipulation panel portion 95 may be made of a metal or resin material.

The manipulation button portion 96 may protrude upward from the manipulation panel portion 95 and may be exposed to the outside through the grip case part 11. For example, the manipulation button portion 96 may be assembled in the manipulation panel portion 95.

The manipulation locking portion 97 may extend from the manipulation panel portion 95 and may be locked and fixed to the assembly unit 30 through the grip connection part 12. For example, the manipulation locking portion 97 may be integrally formed with the manipulation panel portion 95. The manipulation locking portion 97 may include first manipulation locking portions 971 that extend downward from the left and right sides of the manipulation panel portion 95 and second manipulation locking portions 972 that extend forward from the lower end portions of the first manipulation locking portions 971 and pass through the through hole portions 915 to be locked and fixed to the assembly unit 30 at front end portions of the second manipulation locking portions 972.

The manipulation restoring portion 98 may elastically support the manipulation panel portion 95. For example, the manipulation restoring portion 98 may be formed in a spring shape and may be disposed between the connection body portion 91 and the manipulation panel portion 95 to provide a restoring force to the manipulation panel portion 95.

Figure 6:
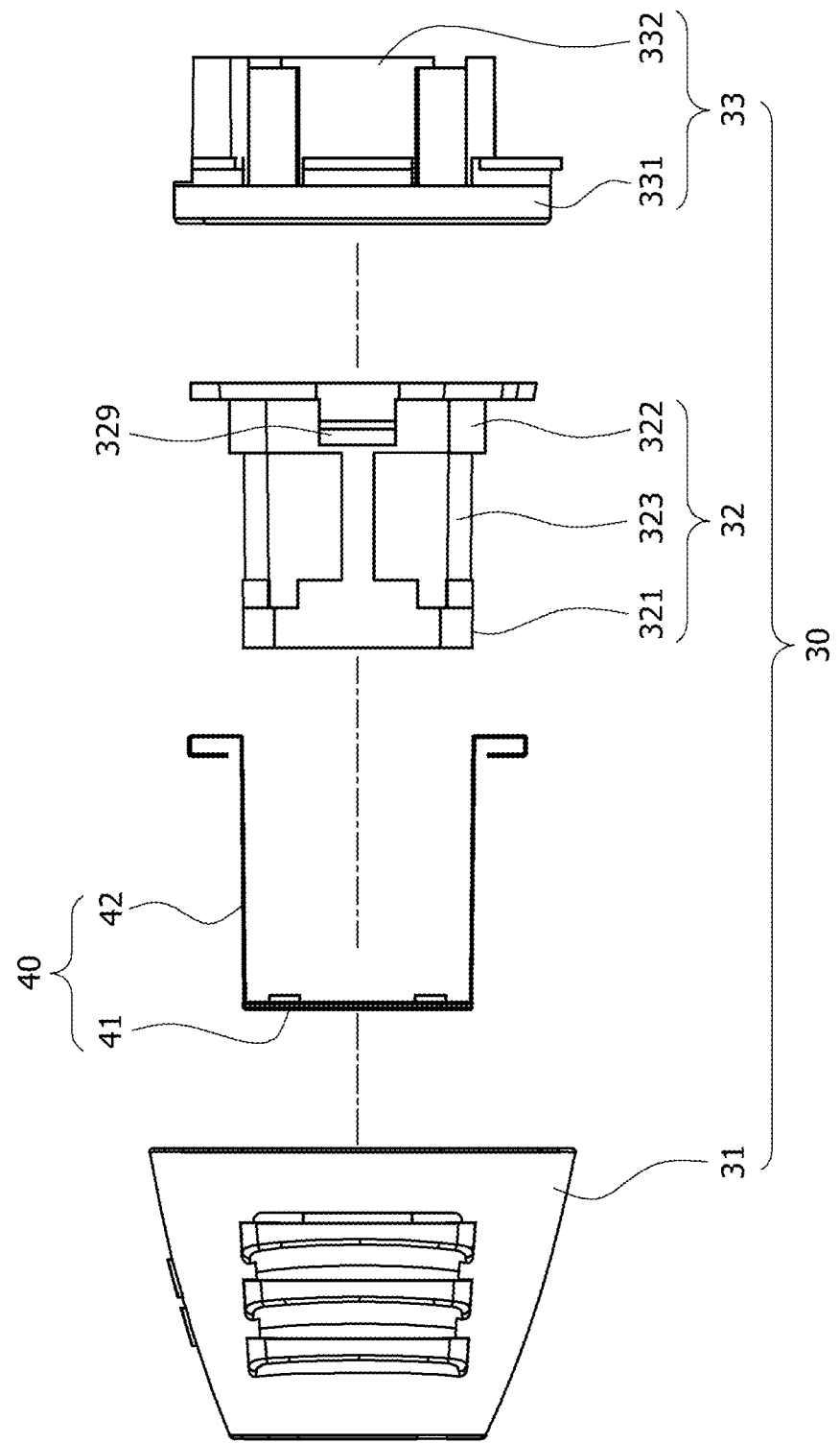
FIG. 6 is a schematic diagram illustrating an assembly unit according to one embodiment of the present invention.

FIG. 6 is a schematic diagram illustrating the assembly unit according to one embodiment of the present invention. Referring to FIG. 6, the assembly unit 30 according to one embodiment of the present invention may include an assembly case part 31 and an assembly support part 32.

A front portion of the assembly case part 31 may be open to guide the output unit 40 to be exposed to the outside. For example, the assembly case part 31 may have a duct shape and have a shape in which the front surface is open.

The assembly support part 32 may be built in the assembly case part 31 and support the output unit 40 and the cooling unit 50. For example, the assembly support part 32 may include a first support frame portion 321, a second support frame portion 322, and a third support frame portion 323 that connects the first support frame portion 321 and the second support frame portion 322. A hole may be formed in the central portion of each of the first support frame portion 321 and the second support frame portion 322. A support locking portion 329 to be locked and fixed to the assembly case part 31 may be formed on the second support frame portion 322. A hole that guides the manipulation locking portion 97 to pass therethrough and to be locked and fixed thereto may be formed in the second support frame portion 322.

Meanwhile, the output unit 40 may include a first output part 41 that is exposed to the outside and comes into contact with the skin, outputs a high frequency pulse when power is applied, and is supported by the first support frame portion 321 and a second output part 42 that is connected to the first output part 41, extends rearward, and is connected to the connection pin portion 92.

In addition, the assembly unit 30 may further include an assembly guide part 33. The assembly guide part 33 may be coupled to the assembly support part 32, and inserted into the grip connection part 12 to guide air into the assembly support part 32. For example, the assembly guide part 33 may include a first assembly guide portion 331 that is screw-coupled to the second support frame portion 322 and a second assembly guide portion 332 that extends from the first assembly guide portion 331, is inserted into the connection body portion 91, and has a duct shape to guide air. A hole that guides the manipulation locking portion 97 to pass therethrough and to be locked and fixed thereto may be formed in the first assembly guide portion 331.

Figure 7:
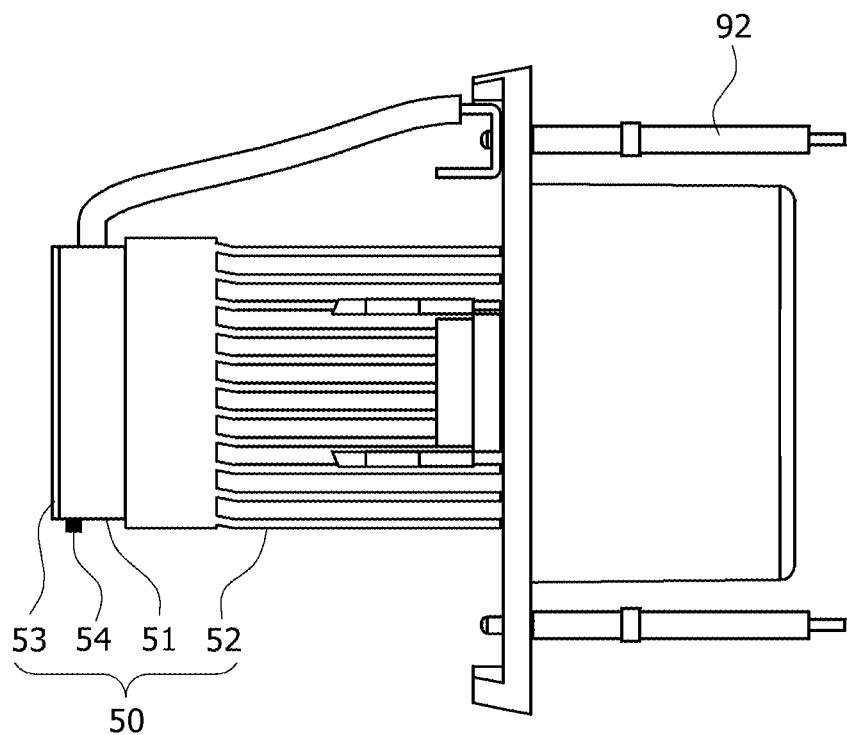
FIG. 7 is a schematic diagram illustrating a cooling unit according to one embodiment of the present invention.

FIG. 7 is a schematic diagram illustrating the cooling unit according to one embodiment of the present invention. Referring to FIG. 7, the cooling unit 50 according to one embodiment of the present invention may include a cooling element part 51 and a cooling heat exchanger part 52.

The cooling element part 51 may be a Peltier element that comes into contact with the output unit 40. The cooling element part 51 may be connected to the connection pin portion 92, and when power is applied, one side surface of the cooling element part 51 may cool the first output part 41 and the other side surface of the cooling element part 51 may be heated. The cooling element part 51 may be inserted into the first support frame portion 321.

The cooling heat exchanger part 52 may come into contact with the cooling element part 51 and discharge heat transmitted through the cooling element part 51. For example, the cooling heat exchanger part 52 may come into contact with the cooling element part 51 and have a plurality of cooling fins. The cooling heat exchanger part 52 may be built in the assembly support part 32.

Meanwhile, the cooling unit 50 may further include a cooling pad part 53. The cooling pad part 53 may be attached to a front portion of the cooling element part 51 and disposed between the cooling element part 51 and the first output part 41. The cooling pad part 53 may come into contact with the side surfaces of the first output part 41 and the cooling element part 51 to stably support the first output part 41 and improve the thermal conductivity.

In addition, the cooling unit 50 may further include a cooling sensor part 54. The cooling sensor part 54 may be mounted on the cooling element part 51 to measure the temperature of the cooling element part 51, and the board may apply power to the cooling element part 51 based on a signal from the cooling sensor part 54. In addition, the cooling sensor part 54 may measure the temperature of the output unit 40.

Figure 8:
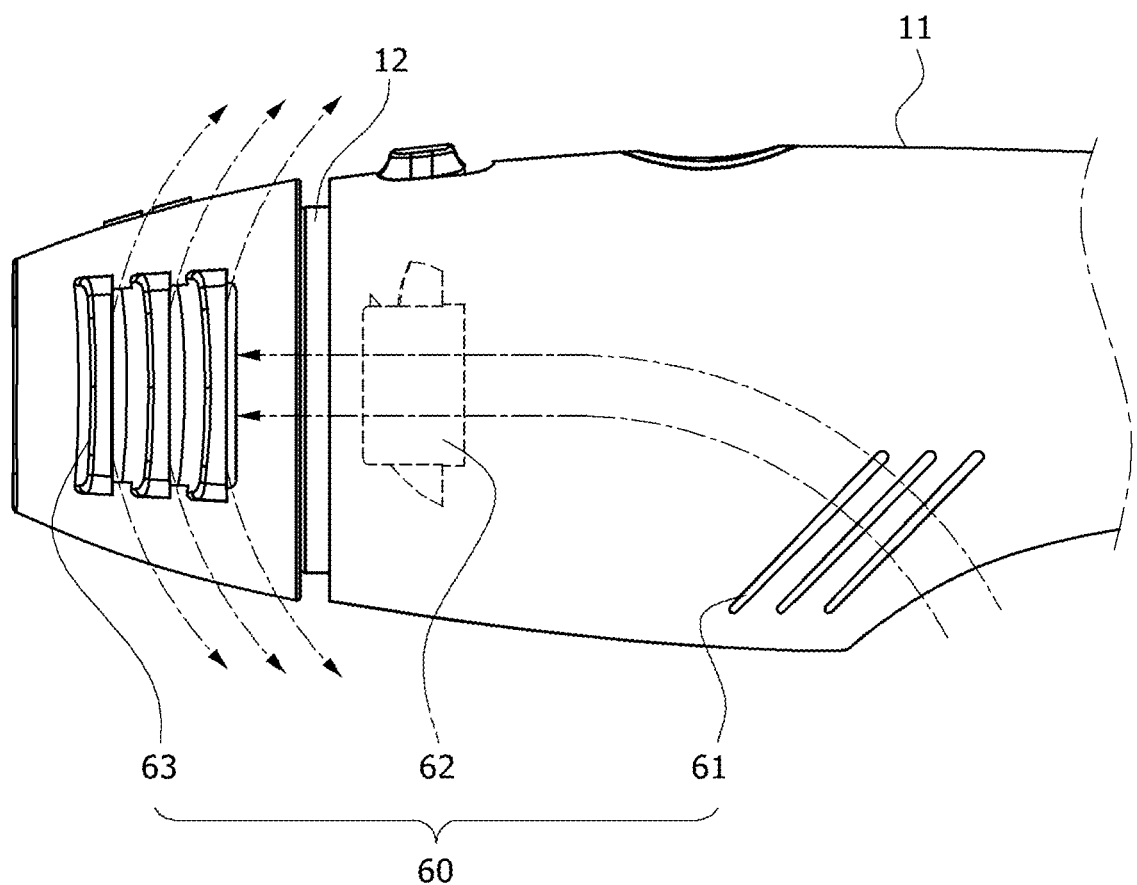
FIG. 8 is a schematic diagram illustrating air flow through an air cooling unit according to one embodiment of the present invention.

FIG. 8 is a schematic diagram illustrating the air flow through an air cooling unit according to one embodiment of the present invention. Referring to FIG. 8, the skin treatment device 1 with overheating protection according to one embodiment of the present invention may further include an air cooling unit 60. The air cooling unit 60 may supply external air to the cooling unit 50 to forcibly cool the cooling unit 50.

More specifically, the air cooling unit 60 may include an air inflow part 61, an air discharge part 62, and an air outflow part 63.

The air inflow part 61 may be formed in the grip unit 10 and guide external air into the inside of the grip unit 10. For example, the air inflow parts 61 may be formed at both sides of the grip case part 11 and form holes to guide external air inflow. In addition, the air inflow parts 61 may have holes formed in one side or three or more portions of the grip case part 11, and the holes may be formed parallel, diagonal, or vertical to a longitudinal direction of the grip case part 11. Meanwhile, the hole shape of the air inflow part 61 may be elongated or circular, and holes of various other shapes may be formed.

The air discharge part 62 may be built in the grip unit 10, and the air introduced through the air inflow part 61 may be discharged to the cooling unit 50. For example, the air discharge part 62 may be fixedly installed inside the grip case part 11, be connected to the power unit 20 or the board, and function as a cooling fan that discharges air when power is applied. The air discharge part 62 may be disposed behind the grip connection part 12 and disposed in front of the air inflow part 61, and the air introduced into the air inflow part 61 may be supplied to the cooling unit 50 through the inside of the grip connection part 12 by the air discharge part 62.

The air outflow part 63 may be formed in the assembly unit 30 and guide the air that has passed through the cooling unit 50 to the outside. For example, the air outflow part 63 may be formed on a side surface portion of the assembly case part 31 and have one or more holes for air discharge. The air outflow part 63 may guide the air to be discharged in a direction opposite to the surface of the skin to be treated, that is, opposite to the direction in which the high frequency pulse is emitted through the output unit 40.

The operation of the skin treatment device with overheating protection according to one embodiment of the present invention having the above structure will now be described.

The grip connection part 12 and the grip manipulation part 13 are mounted on the grip case part 11, and the air discharge part 62 is installed behind the grip connection part 12. In addition, the output unit 40 and the cooling unit 50 are mounted on the assembly unit 30.

When the assembly unit 30 equipped with the output unit 40 and the cooling unit 50 is assembled in the grip case part 11, the assembly unit 30 is locked and fixed to the grip manipulation part 13, and the output unit 40 and the cooling unit 50 are electrically connected to each other by the grip connection part 12.

When power is applied to the output unit 40 and the cooling unit 50 for skin treatment in the state described above, the output unit 40 that comes into contact with the skin outputs a high frequency pulse to treat the skin. In this case, the output unit 40 is heated, and the cooling unit 50 in contact with the output unit 40 can cool the output unit 40 with the Peltier element and discharge the heated air to the outside.

Meanwhile, when the air discharge part 62 is driven, the air introduced through the air inflow part 61 is discharged to the cooling unit 50 by the air discharge part 62. The air discharged to the cooling unit 50 by the air discharge part 62 passes between the cooling fins of the cooling heat exchanger part 52 and then is discharged to the air outflow part 63, and thus it is possible to achieve rapid heat discharge of the cooling unit 50 and improve a heat discharge effect of the cooling unit 50.

According to the skin treatment device 1 with overheating protection of one embodiment of the present invention, even if the output unit 40 is heated during the skin treatment process, the output unit 40 is rapidly cooled by the cooling unit 50, and thus skin damage due to overheating can be prevented, and the assembly unit 30 equipped with the output unit 40 and the cooling unit 50 is detachably attached to the grip unit 10, and thus the assembly unit 30 can be conveniently replaced.

Although the present invention has been described with reference to embodiments shown in the drawings, it is merely exemplary, and those skilled in the art will understand that various modifications and other equivalent embodiments are possible. Therefore, the true technical protection scope of the present invention should be determined from the following claims.

The invention claimed is:

1. A skin treatment device with overheating protection, comprising:
   a grip unit allowed to be gripped;
   a power unit connected to the grip unit to supply power;
   an assembly unit detachably attached to the grip unit;
   an output unit mounted on the assembly unit, connected to the grip unit to receive power, and configured to come into contact with skin to output a high frequency pulse; and
   a cooling unit configured to cool the output unit,
   wherein the assembly unit includes:
      an assembly case part of which a front portion is open to expose the output unit to the outside;
      an assembly support part built in the assembly case part and configured to support the output unit and the cooling unit; and
      an assembly guide part coupled to the assembly support part and inserted into the grip unit to guide air into the assembly support part.

2. The skin treatment device with overheating protection according to claim 1, wherein the grip unit includes:
   a grip case part;
   a grip connection part mounted on the grip case part and connecting the power unit and the output unit; and
   a grip manipulation part mounted on the grip case part and coupled to or separated from the assembly unit.

3. The skin treatment device with overheating protection according to claim 2, wherein the grip connection part includes:
   a connection body portion coupled to a front end portion of the grip case part; and
   at least one connection pin portion passing through the connection body portion and having one end portion connected to the power unit and the other end portion connected to the output unit.

4. The skin treatment device with overheating protection according to claim 2, wherein the grip manipulation part includes:
   a manipulation panel portion disposed inside the grip case part;
   a manipulation button portion protruding upward from the manipulation panel portion and exposed to the outside through the grip case part;
   a manipulation locking portion extending from the manipulation panel portion and locked and fixed to the assembly unit through the grip connection part; and
   a manipulation restoring portion configured to elastically support the manipulation panel portion.

5. The skin treatment device with overheating protection according to claim 1, wherein the cooling unit includes:

a cooling element part configured to come into contact with the output unit and cool the output unit with a Peltier element; and
   a cooling heat exchanger part configured to come into contact with the cooling element part and discharge heat transmitted through the cooling element part.

6. The skin treatment device with overheating protection according to claim 1, further comprising an air cooling unit configured to supply external air to the cooling unit to forcibly cool the cooling unit.

7. The skin treatment device with overheating protection according to claim 6, wherein the air cooling unit includes:
   an air inflow part formed in the grip unit and configured to guide external air into the grip unit;
   an air discharge part built in the grip unit and configured to discharge air introduced through the air inflow part to the cooling unit; and
   an air outflow part formed in the assembly unit and configured to guide air that has passed through the cooling unit to the outside.

* * * * *